(12) United States Patent
Brun-Buisson et al.

(10) Patent No.: US 11,165,103 B2
(45) Date of Patent: Nov. 2, 2021

(54) METHOD FOR REGENERATING THE CAPACITY OF AN ELECTROCHEMICAL LITHIUM BATTERY, AND ASSOCIATED BATTERY HOUSING AND BATTERY

(71) Applicant: COMMISSARIAT À L'ENERGIE ATOMIQUE ET AUX ENERGIES ALTERNATIVES, Paris (FR)

(72) Inventors: David Brun-Buisson, Vatilieu (FR); Sylvie Genies, Saint-Egreve (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 75 days.

(21) Appl. No.: 15/115,843

(22) PCT Filed: Jan. 27, 2015

(86) PCT No.: PCT/IB2015/050611
§ 371 (c)(1),
(2) Date: Aug. 1, 2016

(87) PCT Pub. No.: WO2015/114517
PCT Pub. Date: Aug. 6, 2015

(65) Prior Publication Data
US 2017/0012323 A1  Jan. 12, 2017

(30) Foreign Application Priority Data
Jan. 31, 2014 (FR) ...................................... 1450778

(51) Int. Cl.
| | | |
|---|---|---|
| *H01M 10/42* | (2006.01) | |
| *H01M 6/50* | (2006.01) | |
| *H01M 10/34* | (2006.01) | |
| *H01M 10/52* | (2006.01) | |
| *H01M 2/02* | (2006.01) | |

(Continued)

(52) U.S. Cl.
CPC ..... *H01M 10/4242* (2013.01); *H01M 10/052* (2013.01); *H01M 10/0525* (2013.01);
(Continued)

(58) Field of Classification Search
None
See application file for complete search history.

(56) References Cited

U.S. PATENT DOCUMENTS 5,769,874 A * 6/1998 Dahlberg ............... A61N 1/375
607/36
7,335,448 B2  2/2008 Kaito et al.
(Continued)

FOREIGN PATENT DOCUMENTS

EP  2595235 A1  5/2013
FR  0 867 954  *  5/2001 ............. H01M 2/32
(Continued)

OTHER PUBLICATIONS

Jun. 2, 2015 International Search Report issued in International Patent Application No. PCT/IB2015/050611.

*Primary Examiner* — Cynthia H Kelly
*Assistant Examiner* — Julian Anthony
(74) *Attorney, Agent, or Firm* — Oliff PLC (57) ABSTRACT

The invention relates to a method for regenerating the capacity of an electrochemical lithium battery, including the following steps: a) evaluating the quantity of lithium ions; b) when the evaluated lithium ion quantity is less than or equal to a threshold value, applying an electric current between the cathode or the anode and the container such as to cause the delithiation of the casing, the casing is also arranged to house an element providing both electric insulation and ionic conduction between the anode and cathode electrodes of the electrochemical cell and the casing, said casing including at least one lithium ion storage zone.

13 Claims, 3 Drawing Sheets

(51) Int. Cl.
    *H01M 10/16*     (2006.01)
    *H01M 4/13*      (2010.01)
    *H01M 4/58*      (2010.01)
    *H01M 10/48*     (2006.01)
    *H01M 10/052*    (2010.01)
    *H01M 50/116*    (2021.01)
    *H01M 50/124*    (2021.01)
    *H01M 50/545*    (2021.01)
    *H01M 10/0525*   (2010.01)

(52) U.S. Cl.
    CPC ......... *H01M 10/48* (2013.01); *H01M 50/116* (2021.01); *H01M 50/124* (2021.01); *H01M 50/1243* (2021.01); *H01M 50/545* (2021.01)

(56) References Cited

U.S. PATENT DOCUMENTS

| | | | |
|---|---|---|---|
| 7,338,733 | B2 | 3/2008 | Morita et al. |
| 7,348,098 | B2 | 3/2008 | Hayashi et al. |
| 2002/0182508 | A1* | 12/2002 | Nimon ............... H01M 4/04 429/231.95 |
| 2006/0121348 | A1 | 6/2006 | Mizutani et al. |
| 2008/0057392 | A1 | 3/2008 | Takamatsu et al. |
| 2008/0060189 | A1 | 3/2008 | Daidoji et al. |
| 2009/0104510 | A1* | 4/2009 | Fulop ............... H01M 2/30 429/50 |
| 2010/0316094 | A1 | 12/2010 | Tung |
| 2015/0275384 | A1* | 10/2015 | Viavattine ......... H01M 10/0445 205/59 |

FOREIGN PATENT DOCUMENTS

| | | |
|---|---|---|
| JP | H08-167401 A | 6/1996 |
| JP | 2008-171649 A | 7/2008 |
| JP | 2011-076930 A | 4/2011 |
| JP | 2012-089471 A | 5/2012 |
| WO | 2008/002626 A2 | 1/2008 |
| WO | 2010/113502 A1 | 10/2010 |
| WO | 2012/024211 A1 | 2/2012 |

* cited by examiner

METHOD FOR REGENERATING THE CAPACITY OF AN ELECTROCHEMICAL LITHIUM BATTERY, AND ASSOCIATED BATTERY HOUSING AND BATTERY

TECHNICAL FIELD

The present invention relates to the field of lithium electrochemical generators that operate according to the principal of insertion or deinsertion, or in other words intercalation-deintercalation, of lithium into at least one electrode.

It more particularly relates to a lithium electrochemical accumulator of the Li-ion type including at least one electrochemical cell consisting of an anode (negative electrode) and a cathode (positive electrode) on either side of a separator impregnated with electrolyte, two current collectors one of which is connected to the anode and the other to the cathode, and a casing arranged to house the electrochemical cell with seal-tightness while being passed through by a portion of the current collectors forming the output terminals, also called poles.

The separator may consist of one or more films.

The invention aims to provide a method for regenerating the capacity of electrochemical generators.

By "capacity regeneration", what is meant here and in the context of the invention is the reconstitution of the capacity of an accumulator set initially by the materials of the electrodes of the constituent cell(s) thereof, i.e. of the initial power level extractable in 1 hour.

Although described with reference to a Li-ion accumulator, the invention applies to any lithium electrochemical accumulator.

PRIOR ART

Figure 1:
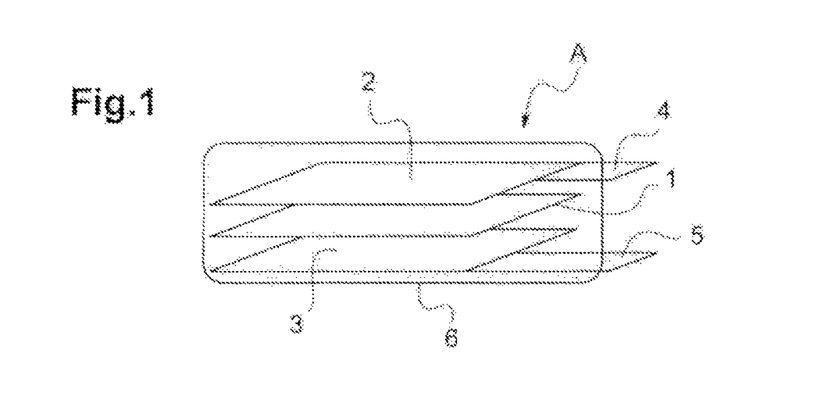
FIG. 1 is a schematic exploded perspective view showing the various elements of a lithium-ion accumulator.
Figures 2, 3:
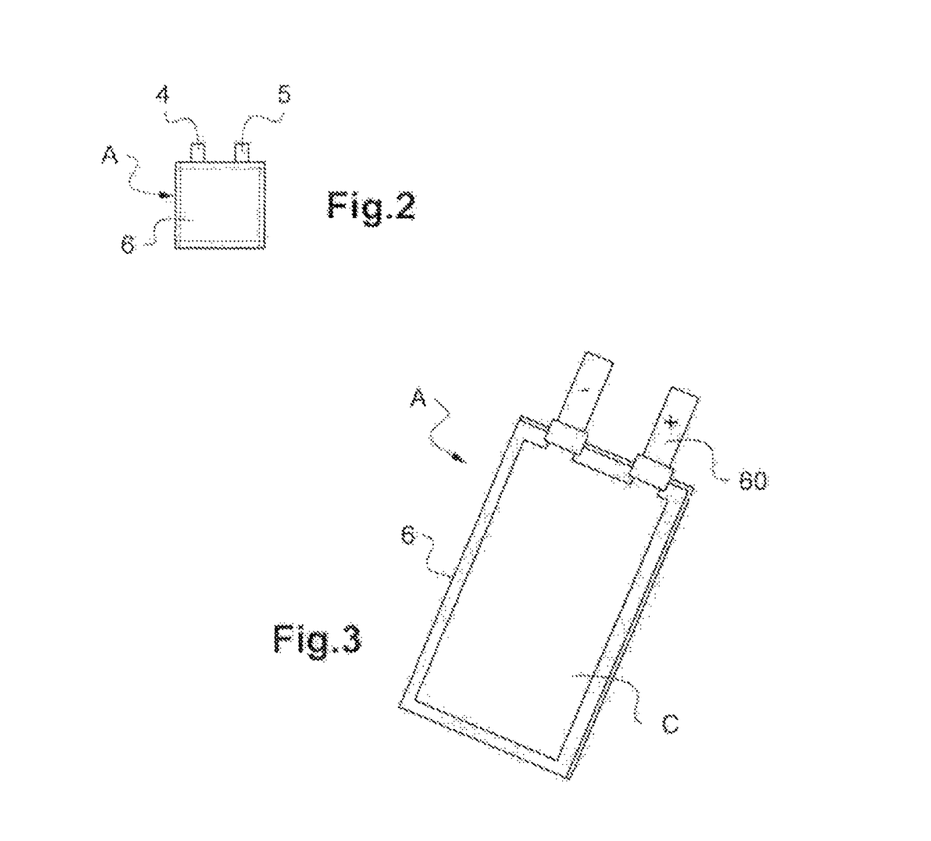
FIG. 2 is a front view showing a lithium-ion accumulator with its flexible package according to the prior art.
FIG. 3 is a perspective see-through view of a lithium-ion accumulator with its flexible package according to the prior art.

Such as schematically illustrated in FIGS. 1 and 2, a lithium-ion accumulator or battery A usually includes at least one electrochemical cell C consisting of a separator impregnated with a constituent electrolyte 1 between a positive electrode or cathode 2 and a negative electrode or anode 3, a current collector 4 connected to the cathode 2, a current collector 5 connected to the anode 3 and, lastly, a package 6 arranged to contain the electrochemical cell with seal-tightness while being passed through by a portion of the current collectors 4, 5 forming the output terminals.

The architecture of conventional lithium-ion batteries is an architecture that may be qualified as monopolar, because with a single electrochemical cell including an anode, a cathode and an electrolyte. A number of types of monopolar architecture geometry are known:
- a cylindrical geometry such as disclosed in patent application US 2006/0121348;
- a prismatic geometry such as disclosed in patents U.S. Pat. No. 7,348,098 and U.S. Pat. No. 7,338,733; and
- a stacked geometry such as disclosed in patent applications US 2008/060189 and US 2008/0057392 and patent U.S. Pat. No. 7,335,448.

The constituent electrolyte may be a solid, liquid or gel. In the latter form, the constituent may comprise a separator, taking the form of one or more films, made of a polymer or microporous composite imbibed with organic or liquid-ionic electrolyte(s) that allow lithium ions to move from the cathode to the anode for a charge and vice versa for a discharge, thereby generating the current. The electrolyte is in general a mixture of organic solvents, for example of carbonates, to which a lithium salt, typically $LiPF_6$, is added.

The positive electrode or cathode 2 consists of insertion materials of the lithium cation which are in general composites, such as lithium iron phosphate $LiFePO_4$, lithium cobalt oxide $LiCoO_2$, optionally substituted lithium manganese oxide $LiMn_2O_4$ or a material based on $LiNi_xMn_yCo_zO_2$ where x+y+z=1, such as $LiNi_{0.33}Mn_{0.33}Co_{0.33}O_2$, or a material based on $LiNi_xCo_yAl_zO_2$ where x+y+z=1, $LiMn_2O_4$, $LiNiMnCoO_2$ or lithium nickel cobalt aluminum oxide $LiNiCoAlO_2$.

The negative electrode or anode 3 very often consists of carbon, graphite or is made of $Li_4TiO_5O_{12}$ (titanate material), though also optionally is based on silicon or based on lithium, or based on tin and alloys thereof or on a silicon-based composite.

The anode 3 and the cathode 2 made of lithium insertion material may be deposited using a conventional technique in the form of an active layer on a metal sheet forming a current collector.

The current collector 4 connected to the positive electrode is in general made of aluminum.

The current collector 5 connected to the negative electrode is in general made of copper, of nickel-coated copper or of aluminum.

A lithium-ion accumulator or battery may very obviously include a plurality of electrochemical cells that are stacked on top of one another.

Conventionally, a Li-ion accumulator or battery uses a pair of materials at the anode and at the cathode that allow it to operate at a high voltage level, typically about 3.6 volts.

Depending on the type of application targeted, it is sought to produce either a thin and flexible lithium-ion accumulator, or a rigid accumulator: the package is then either flexible, or rigid and forms in the latter case a casing so to speak.

Flexible packages are usually manufactured from a multilayer composite consisting of a stack of aluminum layers covered with one or more polymer films laminated by adhesive bonding.

FIG. 3 illustrates this type of flexible package 6, which is arranged to contain the electrochemical cell C with seal-tightness while being passed through by portions 40, 50 of two strips 4, 5 forming the poles and that extend in the plane of the electrochemical cell. As FIG. 3 shows, polyolefin-based polymer reinforcements 60 may be provided to improve the heat seal of the package 6 around the strips 4, 5. The main advantage of flexible packages is their lightness. The Li-ion accumulators with the highest energy densities therefore include a flexible package. The major drawback of these flexible packages is that their seal-tightness greatly deteriorates over time because of the chemical nonresistance of the seal produced.

A Li-ion accumulator or battery includes a rigid package or casing when the targeted applications are constraining, when for example very high pressures are to be withstood and a stricter seal-tightness level (typically lower than $10^{-6}$ mbar.l/s helium) is required, or a long lifetime is sought, or in highly constraining environments such as in the spatial or aeronautic field. The main advantage of rigid packages is their high seal-tightness, which is maintained over time because the casings are closed by welding, in general by laser welding.

Thus, at the present time, one rigid package used consists of a metal casing, generally made of a light and inexpensive metal, typically made of stainless steel (316L or 304 stainless steel) or of aluminum (1050 or 3003 Al), or even of titanium. Furthermore, aluminum is generally preferred for its high thermal conductivity coefficient as explained below. Casings made of stainless steel covered with a bimetal coating made of copper/nickel have already been envisioned in patent application WO 2010/113502.

Plastic casings, in particular integrally made of polymer have also already been envisioned, in particular in patent application US 2010/316094. Although they have a high mechanical strength, these casings have little chance of being economically viable because of the price of their constituent material.

Casings made of hybrid polymer/fiber materials have also been envisioned.

The main advantage of rigid packages is their high seal-tightness, which is maintained over time because the casings are closed by welding, in general by laser welding.

The geometry of most Li-ion-accumulator casings is cylindrical, because most accumulator electrochemical cells are wound by spooling into a cylindrical geometry. Casings of prismatic shapes have also already been produced.

Figures 4, 5A:
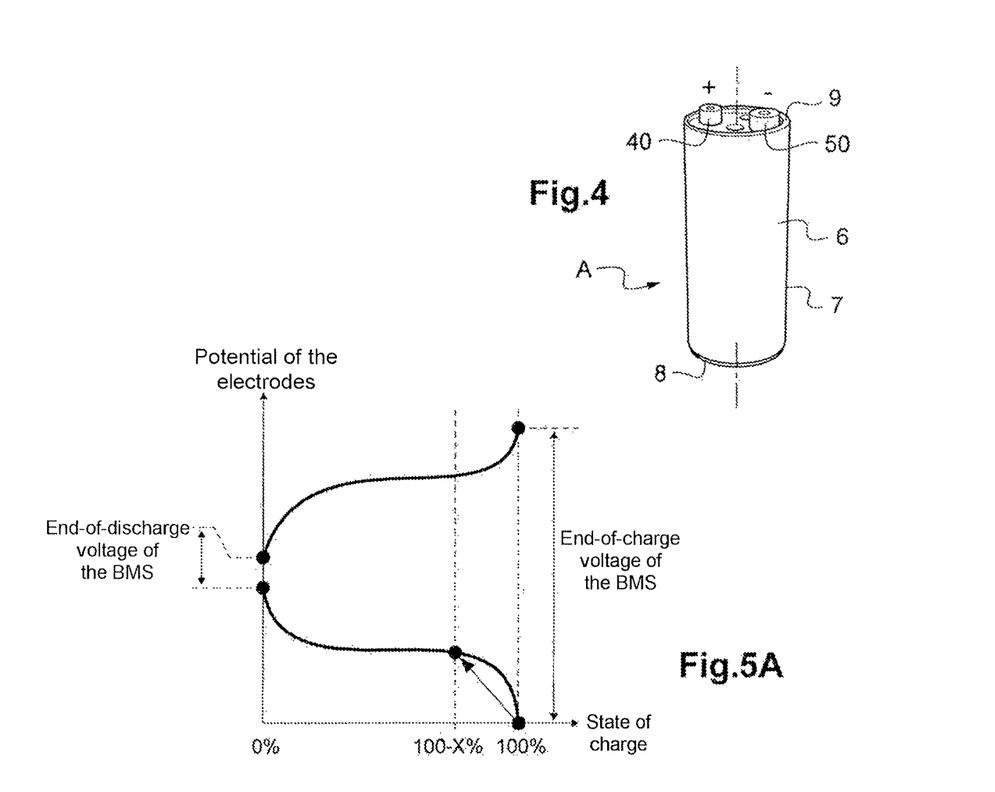
FIG. 4 is a perspective view of a cylindrical lithium-ion accumulator according to the prior art with its rigid package consisting of a casing.
FIGS. 5A and 5B illustrate curves of the potential of the electrodes (cathode above and anode below) of a Li-ion accumulator as a function of their charge, at an initial capacity corresponding to 100% of the state of charge and at a lower capacity corresponding to 100-x % of the state of charge with a loss of x % of charge at the negative electrode generated by the lack of exchangeable lithium ions, respectively.

One of the types of cylindrically shaped rigid casing usually manufactured for a high-capacity Li-ion accumulator of lifetime longer than ten years is illustrated in FIG. 4.

The casing 6, of longitudinal axis X, includes a cylindrical lateral jacket 7, a bottom 8 at one end, and a cover 9 at the other end. The cover 9 bears the terminals or poles 40, 50 through which the current is output. One of the output terminals (poles), for example the positive terminal 40, is welded to the cover 9, whereas the other output terminal, for example the negative terminal 50, passes through the cover 9 with interposition of a seal (not shown) that electrically insulates the negative terminal 50 from the cover.

Independently of whether the package is flexible or rigid, in all the casings envisioned to this day the electrochemical cell(s) is (are) in fact contained in a chamber that is completely seal-tight with respect to the exterior.

Operation of a lithium-ion (Li-ion) accumulator or battery is based on the principle of reversible oxidation-reduction of the materials that compose the anode (negative electrode) and cathode (positive electrode) by insertion/deinsertion of lithium ions therein/therefrom. This property allows the battery to store energy in electrochemical form.

For example, during a charge, lithium ions are deinserted from the cathode and inserted in the same amount into the anode, and vice versa during discharge. The amount of lithium ions used in these insertion processes is directly proportional to the capacity of the accumulator or battery.

In the particular case of a Li-ion accumulator having an anode made of graphite, it is known that some of the lithium inserted in the charged state in this electrode may react with the surface thereof. This has the effect of creating a passivating film (solid-electrolyte-interphase (SEI)) and of consuming exchangeable lithium, i.e. lithium able to be inserted/deinserted. Thus, the capacity of the accumulator drops proportionally with this consumption of lithium.

Figure 5B:
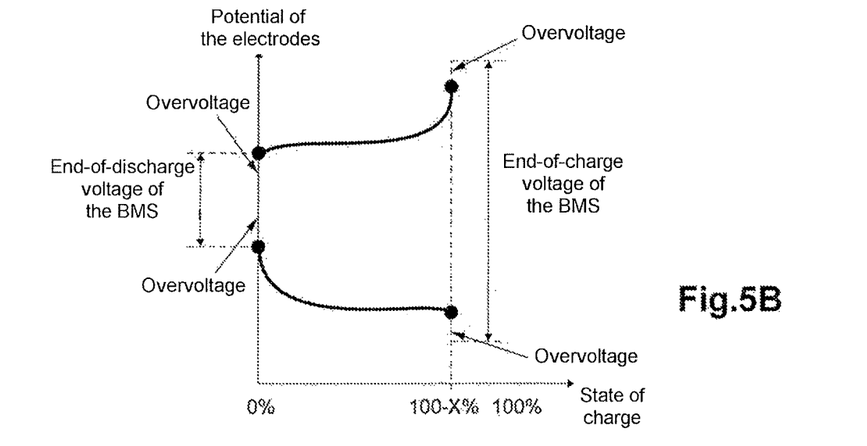

FIGS. 5A and 5B show curves of the potential of the electrodes (cathode above and anode below) of a Li-ion accumulator as a function of their charge, at an initial capacity corresponding to 100% of the state of charge and at a lower capacity corresponding to 100-x% of the state of charge with a loss of x % of charge at the negative electrode generated by the lack of exchangeable lithium ions, respectively.

As illustrated in FIG. 5B when compared to FIG. 5A, the potentials of the active electrode materials are no longer capable of reaching the initial values of the extreme states of charge of the accumulator (0 and 100%) by lithiation/delithiation because of the lack of exchangeable lithium ions.

Battery management systems (BMSs) especially have the function of stopping the application of current once a threshold voltage value, i.e. a potential difference between the two active insertion materials, has been reached.

In the case where the extreme states of charge have values decreased by x % because of the lack of exchangeable lithium ions, the BMS does not stop the application of current early enough, thereby inducing overvoltages on the active insertion materials, thereby causing their degradation. In addition, the engendered loss of capacity induces the appearance of other effects that cause degradation of these materials.

Certain prior-art documents have already identified the problem of loss of capacity in Li-ion accumulators due to the lack of exchangeable lithium ions. The proposed solutions allow lithium ions to be injected to compensate for this lack.

Patent JP2012089471 proposes to insert from the exterior of a Li-ion accumulator, through its package, a piece of equipment, taking the form of a syringe, suitable for injecting $Li^+$ lithium ions. More precisely, the syringe includes a chamber containing an electrolyte product itself making contact with the injection tube that makes it possible to obtain an ionic continuity between the product and the active battery materials by electrolyte filling. The injection tube is electronically conductive in order to allow an exchange of electrons between an active accumulator material and the electrolyte product. The latter has a low redox potential in order to spontaneously engender a reaction with one of the active materials of the two electrodes of the accumulator. The product contains lithium ions that take part in the redox reactions. Thus, by bringing the active insertion material of one of the electrodes and the product into contact, it is possible to insert lithium ions into the active materials, via ionic and electronic conduction. This solution of injection of lithium ions from the exterior by means of a syringe requires an accumulator design that integrates a member allowing penetration of the injection tube through the package. The fragility of the accumulator is therefore increased and the risk of leakage is non-negligible.

Patent applications WO201224211, EP2595235 and JP2011076930, for their part make provision to integrate, into a Li-ion accumulator, a third electrode, i.e. an additional electrode, in addition to the anode and cathode of an electrochemical cell. The third electrode thus integrated is suitable for containing lithium ions that it is possible to extract in order to inject them into the active insertion materials of the accumulator. This operation is carried out electrochemically, by applying a current between this third electrode and an electrode chosen from the anode or cathode of the accumulator. This solution therefore requires the addition of an additional electrode, this having the drawback of adding volume and weight to the accumulator. It is also necessary to add a third output terminal to the architecture of the accumulators, which terminal is electrically connected to the third electrode, in order to apply the current between this third electrode and the electrode into which the lithium ions are injected to regenerate the initial capacity. This third output terminal must necessarily be produced by forming a feedthrough, i.e. with the electrically conductive element insulated from the wall of the package, which is seal-tight. This solution therefore has the major drawback of complexifying the architecture of the Li-ion accumulators.

There is therefore a need to further improve the existing solutions for regenerating the capacity of a lithium accumulator, such as a Li-ion accumulator, especially in order to prevent the appearance of overvoltages therein and to increase its lifetime.

The aim of the invention is to at least partially meet this need.

SUMMARY OF THE INVENTION

To do this, the subject of the invention according to a first of its aspects is a method for regenerating the capacity of a lithium electrochemical accumulator, such as a Li-ion accumulator, including at least one electrochemical cell including an anode, a cathode, and a separator impregnated with an electrolyte between the anode and the cathode, two current collectors one of which is connected to the anode and the other to the cathode, and a casing arranged to house the electrochemical cell with seal-tightness while being passed through by a portion of the current collectors forming the output terminals, the method including the following steps:

a/ evaluating the amount of lithium ions, b/ when the evaluated amount of lithium ions is smaller than or equal to a threshold value, applying an electrical current between the cathode or anode and the casing so as to cause delithiation of the casing, the casing furthermore being arranged to house an element, which is both electrically insulating and ionically conductive, between the anode and cathode electrodes of the electrochemical cell, on the one hand, and the casing, on the other hand, the casing including at least one zone for storing lithium ions.

As mentioned in the preamble, consumption of lithium in an electrode of a lithium accumulator (anode for a Li-ion accumulator) generates a lack of exchangeable lithium ions and therefore causes a loss of capacity and the appearance of overvoltage effects leading to increasingly rapid ageing of the insertion materials over time.

The solution according to the present invention allows lithium ions to be injected into one of the active materials in order to regenerate the capacity of the lithium accumulator and to prevent the appearance, at the end of charging or discharging, of overvoltages that cause degradation of the electrodes; however, in contrast to the prior-art solutions, which are complicated and constraining, it implements storage of lithium ions in an existing component of the accumulator, namely the casing. Thus, the solution for regenerating capacity according to the present invention has the paramount advantage of not complicating the architecture of the accumulator.

The invention firstly consists in evaluating the amount of lithium lost, i.e. the lack of exchangeable lithium ions.

The method according to the present invention requires only a specific Li-ion accumulator architecture.

Thus, the casing is electrically insulated both from the anode and cathode of the accumulator. An added element both allows ionic conduction between the material(s) of the casing and the active lithium insertion materials, and electrical insulation of these materials. It will be noted that, according to the invention, the two terminals are electrically insulated from the casing. Advantageously, it is possible to use, for the added element, the same material as that of the electrolyte-impregnated separator arranged between the lithium insertion material of the anode and that of the cathode.

Lastly, the constituent material of the casing is electronically conductive and includes at least one zone for storing lithium ions within the crystal structure of the casing. Thus, provision is made, according to the invention, to integrate, directly into the casing before the final assembly of the accumulator, an amount of lithium that is able to compensate for the lack of exchangeable lithium ions.

The evaluation of the lack of exchangeable lithium and modification of the architecture of the lithium accumulator and of its casing with at least one zone for storing lithium that are provided for according to the invention allow either the BMS or an operator charged with maintenance of the accumulator to carry out a delithiation of its casing by applying an electrical current between the cathode or anode of the accumulator and the casing. The lithium ions extracted from their storage zone in the casing are then inserted into the active lithium insertion material, thereby allowing exchangeable lithium to be recuperated. The capacity of the accumulator is regenerated directly thereby.

Three variants may be envisioned for the evaluating step a/ according to the invention:

measuring the electrical potential of a reference electrode. Specifically, the potential of an electrode is, for active insertion materials that are what are called single-phase materials, the thermodynamic expression of the amount of inserted lithium;

measuring a capacity difference with respect to the initial capacity of the accumulator; and measuring electrochemical impedance. Specifically, such a measurement allows an estimation by correlation of the amount of passivation film (SEI) that has been produced by the lithium-consuming reaction.

It is therefore possible to calculate the lacking amount of exchangeable lithium.

The application of the current in step b/ is preferably carried out with regulation by means of an electronic device. The electronic device is advantageously suitable for calculating the integral of the current as a function of time in order to determine the regenerated capacity, which is directly proportional to the amount of lithium injected into the active materials.

The invention also relates, according to another of its aspects, to a lithium electrochemical accumulator (A), such as a Li-ion accumulator, including:

at least one electrochemical cell C including an anode, a cathode and a separator impregnated with an electrolyte between the anode and cathode, two current collectors one of which is connected to the anode and the other to the cathode, a casing arranged to house the electrochemical cell with seal-tightness while being passed through by a portion of the current collectors forming the output terminals, the casing furthermore being arranged to house an element, which is both electrically insulating and ionically conductive, between the anode and cathode electrodes of the electrochemical cell, on the one hand, and the casing, on the other hand, the casing including at least one zone for storing lithium ions.

The material, preferably a metal, from which the casing is made must not only provide a good mechanical performance, but also be able to store lithium.

Because of its good mechanical strength, aluminum is an advantageous material for producing an accumulator casing. In addition, the inventors have carried out trials that have made it possible to show that a substrate made of aluminum may be lithiated electrochemically, leading to the obtainment of a lithium-aluminum alloy of formula $Li_xAl$ with x comprised between 0 and 1. The alloy may thus be formed through some of the thickness of the casing, the lithium concentration decreasing with depth uniformly over the entire inside area of the casing.

In the case where the lithium ions diffuse, over the lifetime of the battery, into the casing in which they are stored, measures are advantageously taken to prevent them from diffusing to the exterior side of the casing. In such a situation, the casing of the accumulator may advantageously include a diffusion barrier layer forming a barrier to diffusion of the lithium ions. This barrier layer may be produced on the external periphery of the casing substrate or in the thickness of the latter. The diffusion barrier layer is preferably a layer made of aluminum oxide or alumina $Al_2O_3$.

According to a first variant, the electrically insulating and ionically conductive element advantageously consists of at least one film made of a polymer chosen from polyvinylidene fluoride (PVDF), polyvinyl acetate (PVA), polymethyl methacrylate (PMMA), polyoxyethylene (POE) and polyethylene terephthalate (PET), or of a polymer chosen from polyolefins such as polypropylene, polyethylene or cellulose.

According to a second variant, the electrically insulating and ionically conductive element is a protective layer deposited on the internal face of the substrate of the casing. By way of example, this protective layer may be an oxide layer, a carbonate layer, etc.

Whatever the variant, the electrically insulating and ionically conductive element must insulate the two terminals from the casing.

The expression "anode or cathode made of lithium-insertion material" is understood to mean an electrode comprising at least one lithium-insertion material and at least one binder made of polymer. Optionally, the electrode may in addition comprise an electronic conductor, for example carbon fibers or carbon black.

The expression "lithium insertion material" is, in particular for the positive electrode, understood to mean a material chosen from spinal lithiated oxides containing manganese, lamellar lithiated oxides, and mixtures thereof, and polyanionic framework lithiated oxides of formula $LiM_y(XO_z)_n$ where M represents an element chosen from Mn, Fe, Co, Ni, Cu, Mg, Zn, V, Ca, Sr, Ba, Ti, Al, Si, B and Mo, and X represents an element chosen from P, Si, Ge, S and As, y, z and n being positive integers.

The expression "lithium insertion material" is also, in particular for the negative electrode, understood to mean a material chosen from: a lithiated or non-lithiated titanium oxide, for example $Li_4Ti_5O_{12}$ or $TiO_2$. More particularly, the negative electrode material may be chosen from carbonated materials, non-lithiated titanium oxides and their derivatives and lithiated titanium oxides, such as $Li_4Ti_5O_{12}$, and their derivatives, and a mixture thereof.

The expression "lithiated derivative" is understood to mean compounds of formula $Li_{(4-x1)}M_{x1}Ti_5O_{12}$ and $Li_4Ti_{(5-y1)}N_{y1}O_{12}$, where x1 and y1 are respectively comprised between 0 and 0.2 and M and N are respectively chemical elements chosen from Na, K, Mg, Nb, Al, Ni, Co, Zr, Cr, Mn, Fe, Cu, Zn, Si and Mo.

The expression "non-lithiated derivative" is here understood to mean $Ti_{(5-y1)}N_{y1}O_{12}$, where y1 is comprised between 0 and 0.2 and N is a chemical element chosen from Na, K, Mg, Nb, Al, Ni, Co, Zr, Cr, Mn, Fe, Cu, Zn, Si and Mo.

According to one variant embodiment, all the anodes are made of $Li_4Ti_5O_{12}$ and the cathodes of $LiFePO_4$.

The term "separator" is here and in the context of the invention understood to mean an electrically insulating ionic conductor formed by at least one polymeric material such as polyvinylidene fluoride (PVDF), polyvinyl acetate (PVA), polymethyl methacrylate (PMMA), polyoxyethylene (POE) or polyethylene terephthalate (PET) or a polymer chosen from polyolefins such as polypropylene, polyethylene or cellulose.

The electrolyte according to the invention may be a liquid formed by a mixture of a carbonate and at least one lithium salt. The expression "lithium salt" is preferably understood to mean a salt chosen from $LiPF_6$, $LiClO_4$, $LiBF_4$ and $LiAsF_6$.

Alternatively, the electrolyte may comprise one or more ionic liquids based on lithium ions, namely a salt formed from lithium cations complexed with organic or inorganic anions, which has the property of being a liquid at room temperature. An ionic liquid, depending on the nature of the anion, may be hydrophilic or hydrophobic. By way of example of ionic liquids, mention may be made of ionic liquids based on hydrophobic anions such as trifluoromethanesulfonate ($CF_3SO_3$), bis(trifluoromethanesulfonate)imide [$(CF_3SO_2)_2N$] and tris(trifluoromethanesulfonate)methide [$(CF_3SO_2)_3C$].

DETAILED DESCRIPTION

Other advantages and features will become more clearly apparent on reading the detailed description, which is given by way of illustration and with reference to the following figures, in which.

For the sake of clarity, the same references have been used to designate the same elements of a Li-ion accumulator according to the prior art and according to the invention in all of FIGS. 1 to 6.

It will be noted that the various elements according to the invention are shown merely for the sake of clarity and that they are not to scale.

FIGS. 1 to 5B have already been commented on in detail in the preamble. They are therefore not described below.

Figure 6:
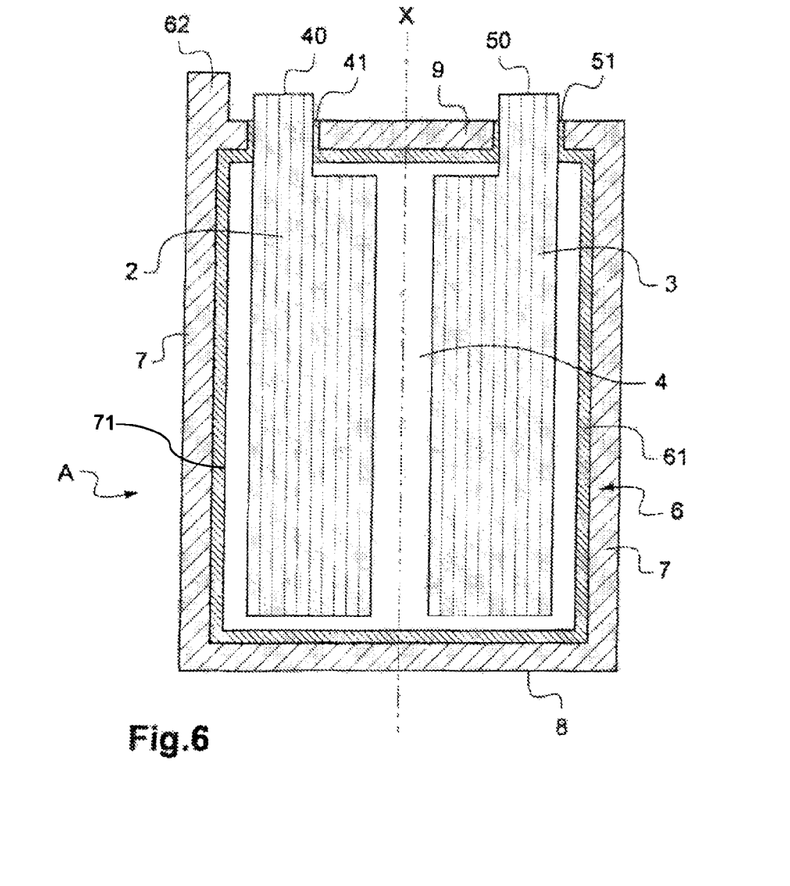
FIG. 6 is a schematic view of a lithium-ion accumulator according to the invention with its rigid package consisting of a casing.

An accumulator according to the invention is shown in FIG. 6. It includes at least one electrochemical cell C consisting of a separator 4 impregnated with a constituent electrolyte between a cathode 2 and an anode 3, a current collector 40 connected to the cathode 2, a current collector 50 connected to the anode 3 and lastly, a casing 6 by way of package arranged to contain the electrochemical cell with seal-tightness while being passed through by a portion of the current collectors 40, 50, forming the output terminals.

The casing 6, of longitudinal axis X, includes a cylindrical lateral jacket 7, a bottom 8 at one end, and a cover 9 at the other end. The cover 9 bears the poles or terminals 40, 50 through which the current is output. Each of the output terminals (poles), i.e. the positive terminal 40 and the negative terminal 50, passes through the cover 9 with interposition of a seal 41, 51 that electrically insulates the positive and negative terminals 40, 50, respectively, from the cover 9. In other words, the two terminals 40, 50 are electrically insulated from the casing 6.

The casing 6 is made of aluminum.

The casing 6 includes a zone 61 for storing lithium ions, which zone is produced in the form of a lithium-containing alloy formed through some of the thickness of the casing and the lithium concentration of which decreases from the internal face of the casing 6 and uniformly over the entirety of this area.

The accumulator furthermore includes, between the anode 3 and cathode 2 of the electrochemical cell and the casing 6, an element 71, taking the form of a film, that is both electrically insulating and ionically conductive.

Lastly, the casing 6 includes a protruding portion that forms a terminal 62, which allows the capacity of the accumulator to be regenerated as explained below. In contrast to prior-art accumulators comprising a third terminal connected to a third electrode, there is no need to seal the terminal 62 according to the invention since said terminal serves for external connection to the casing 6.

An exemplary accumulator according to the invention has been produced with a cylindrical geometry by spooling a cell, said accumulator being of 50 mm diameter, 125 mm height and of an initial capacity of about 18 Ah.

The casing 6 is produced from an aluminum sheet; its weight is 75 g.

The electrode materials are graphite for the anode 3 and lithium iron phosphate (LiFePO$_4$) for the cathode 2.

Since the initial capacity is known, it is possible to calculate the amount of exchangeable lithium ions contained in the accumulator by the following calculation:

$$C*3600*M_{Li}/F.$$

with the following respective values:
$M_{Li}$=6.9 g/mol (molar mass of lithium),
F=96500 C/mol (Faraday's constant),
and C=18 Ah.

The accumulator contains an amount of exchangeable lithium ions equal to 4.63 g.

It is also possible to calculate the amount of lithium ions that can be stored in the casing 6 of this accumulator in the case of complete lithiation of the aluminum casing, or of a Li—Al alloy, by the following calculation:

$$M*M_{Li}/M_{Al}.$$

With a mass M of the casing 6 equal to 75 g and a molar mass of aluminum $M_{Al}$ equal to 27 g/mol, an amount of storable lithium equal to 19.17 g is obtained, i.e. a value more than 4 times higher than the amount of exchangeable lithium ions initially used by the accumulator.

The casing 6 is therefore entirely sufficient as a lithium storage zone. Specifically, the inventors consider that it is reasonable, to regenerate the capacity of a Li-ion accumulator, to store about half the amount of exchangeable lithium. Injecting more than this amount of lithium into the accumulator may lead to other degradation effects becoming preponderant, and it then proves to be impossible to regenerate the accumulator according to the invention. In addition, complete lithiation of the casing 6 would produce a material the mechanical properties of which would be unsatisfactory for the targeted applications of the accumulator.

Thus, in the case of a storage zone loaded with half the amount of exchangeable lithium, i.e. 2.32 g, the alloy obtained is of formula Li$_{0.12}$Al (for uniform lithiation of the bulk of the casing 6).

In practice, the use of such an accumulator, the casing 6 of which is insulated from the two electrodes 2, 3 and lithiated during its manufacture, allows Li$^+$ ions to be injected to increase the amount of exchangeable lithium. This operation is carried out by passing a current between the regenerating terminal 62 of the casing 6 and one of the two electrodes 2 or 3.

The initial capacity of the accumulator is thus regenerated.

In one example according to the invention, it is possible to regenerate the capacity of the Li-ion accumulator by inserting Li$^+$ ions into the cathode 2. Li$^+$ ions may also be inserted into the anode 3.

After the amount of capacity to be regenerated has been calculated, the casing 6 and the cathode 2 are electrically connected to an electronic device (not shown) suitable for regulating current. Specifically, since the redox potential of the positive electrode is higher than that of lithiated aluminum, and as the architecture allows ions to be exchanged between these two components, a negative current may be established leading to the desired effect of injection of exchangeable lithium.

The electronic device allows a current between the casing 6 and the cathode 2 to be regulated.

Advantageously, this device may also integrate the current as a function of time, in order to calculate the regeneration capacity. Preferably, the current must be very low, in order to allow uniform insertion of lithium ions into the active material, and also in order not to destructure the metal of the casing 6.

This device may be integrated into a BMS, or controlled by an exterior operator who wants to regenerate the accumulator.

The limited current is calculated relative to the capacity of lithium ions integrated into the casing. In the case of the preceding example, in which 2.32 g of lithium is inserted into the casing, i.e. a capacity of 9 Ah, a current regime of C/100 or less is used (9 Ah/100h i.e. 90 mA).

Once the amount of lithium to be inserted has been inserted, a cycle of charging/discharging the accumulator may be carried out in order to verify that the regeneration has been effective.

The casing 6 containing lithium ions stored in its internal face 61 may be obtained, before design of the accumulator, by lithiation processes. For example, it is envisionable to perform an electrochemical lithiation. It may also be envisioned to produce a lithium-containing aluminum alloy metallurgically.

The invention is not limited to the examples just described and features of the illustrated examples may be combined together in non-illustrated variants.

Although described with reference to a Li-ion accumulator, the invention may equally well be applied to any electrochemical generator operating on the principle of insertion-deinsertion of Li$^+$ lithium ions.

The invention claimed is:

1. A method for regenerating the capacity of a lithium electrochemical accumulator including at least one electrochemical cell including a cathode, an anode, and a separator impregnated with an electrolyte between the anode and the cathode, two current collectors one of which is connected to the anode and the other to the cathode, and a casing arranged to house the electrochemical cell with seal-tightness while being passed through by a portion of the current collectors forming output terminals, the method comprising:

evaluating the amount of lithium ions;

when the evaluated amount of lithium ions is smaller than or equal to a threshold value, applying an electrical current between the cathode or anode and the casing so as to cause delithiation of the casing, the casing being further arranged to house an element, which is both electrically insulating and ionically conductive, to insulate the casing from the anode and cathode electrodes of the electrochemical cell, while being conductive to ions, the casing having a crystal structure and further including at least one zone for storing lithium ions in the crystal structure of the casing, during the delithiation of the casing, extracting at least a part of the lithium ions stored in the crystal structure of the casing and inserting the part of the extracted lithium ions into at least one of the cathode and the anode, and thereby allowing exchangeable lithium to be recuperated.

2. The regenerating method as claimed in claim 1, wherein evaluating the amount of lithium ions is performed by measuring the electrical potential of a reference electrode.

3. The regenerating method as claimed in claim 1, wherein evaluating the amount of lithium ions is performed by measuring a capacity difference with respect to the initial capacity of the accumulator.

4. The regenerating method as claimed in claim 1, wherein evaluating the amount of lithium ions is performed by measuring electrochemical impedance.

5. The regenerating method as claimed in claim 1, wherein applying the electrical current between the cathode or anode and the casing is performed with regulation by means of an electronic device.

6. The regenerating method as claimed in claim 5, the electronic device being suitable for calculating the integral of the current as a function of time in order to determine the regenerated capacity.

7. A lithium electrochemical accumulator comprising:

at least one electrochemical cell C including a cathode, an anode and a separator, impregnated with an electrolyte, between the anode and cathode;

two current collectors, one of the current collectors being connected to the anode, and the other of the current collectors being connected to the cathode;

a casing arranged to house the electrochemical cell with seal-tightness while being passed through by a portion of the current collectors forming output terminals, the casing having a crystal structure, the casing being further arranged to house an element, which is both electrically insulating and ionically conductive, to insulate the casing from the anode and cathode electrodes of the electrochemical cell, while being conductive to ions, at least one zone for storing lithium ions being included in the crystal structure of the casing, the at least one zone for storing lithium ions being produced in a form of a lithium-containing alloy formed through a portion of a thickness of the casing, and a lithium concentration of the at least one zone decreasing from an internal face of the casing, wherein the accumulator is configured so that, when an electrical current is applied between the cathode or anode and the casing, lithium ions are extracted from the at least one zone for storing lithium ions and are inserted into at least one of the cathode and the anode, thereby allowing exchangeable lithium to be recuperated.

8. The accumulator as claimed in claim 7, the material of the casing being a lithium-aluminum alloy of formula $Li_xAl$ with x comprised between 0 and 1.

9. The accumulator as claimed in claim 8, the lithium-aluminum alloy of formula $Li_xAl$ being obtained by a process of the electrochemical lithiation of a substrate made of aluminum.

10. The accumulator as claimed in claim 7, the casing including a diffusion barrier layer forming a barrier to diffusion of the lithium ions.

11. The accumulator as claimed in claim 10, the diffusion barrier layer being made of aluminum oxide or alumina $Al_2O_3$.

12. The accumulator as claimed in claim 7, the electrically insulating and ionically conductive element consisting of at least one film made of a polymer chosen from polyvinylidene fluoride (PVDF), polyvinyl acetate (PVA), polymethyl methacrylate (PMMA), polyoxyethylene (POE) and polyethylene terephthalate (PET), or of a polymer chosen from polyolefins such as polypropylene, polyethylene or cellulose.

13. The accumulator as claimed in claim 7, the electrically insulating and ionically conductive element being a protective layer deposited on an internal face of the casing.

* * * * *